(12) United States Patent
Suebthawilkul et al.

(10) Patent No.: US 12,077,476 B2
(45) Date of Patent: Sep. 3, 2024

(54) HIGH EMISSIVITY COATING COMPOSITION AND SUBSTRATE COATED THEREWITH

(71) Applicants: SCG Chemicals Co., Ltd., Bangkok (TH); The Siam Refractory Industry Co., Ltd., Bangkok (TH)

(72) Inventors: Somkeat Suebthawilkul, Saraburi (TH); Kanokon Thongrod, Saraburi (TH); Thanapong Prasertphol, Saraburi (TH); Teewin Tuaprakone, Saraburi (TH); Jaturong Jitputti, Bangkok (TH); Koichi Fukuda, Tokyo (JP)

(73) Assignees: SCG Chemicals Co., Ltd., Bangkok (TH); The Siam Refractory Industry Co., Ltd., Bangkok (TH)

( * ) Notice: Subject to any disclaimer, the term of this patent is extended or adjusted under 35 U.S.C. 154(b) by 813 days.

(21) Appl. No.: 17/264,433

(22) PCT Filed: Jul. 30, 2019

(86) PCT No.: PCT/EP2019/070464
§ 371 (c)(1),
(2) Date: Jan. 29, 2021

(87) PCT Pub. No.: WO2020/025601
PCT Pub. Date: Feb. 6, 2020

(65) Prior Publication Data
US 2021/0309574 A1  Oct. 7, 2021

(30) Foreign Application Priority Data
Aug. 1, 2018 (SG) .......................... 10201806558T

(51) Int. Cl.
*C04B 28/34*  (2006.01)
*C04B 14/30*  (2006.01)
(Continued)

(52) U.S. Cl.
CPC .......... *C04B 28/342* (2013.01); *C04B 14/305* (2013.01); *C04B 14/307* (2013.01);
(Continued)

(58) Field of Classification Search
CPC ................ C04B 28/342; C04B 14/305; C04B 14/307; C04B 2111/00163; C04B 2111/00551; C04B 2201/32; C09K 5/14
See application file for complete search history.

(56) References Cited

U.S. PATENT DOCUMENTS 5,668,072 A * 9/1997 Holcombe, Jr. .......... F27D 1/16
106/14.44

FOREIGN PATENT DOCUMENTS

CN   102675933 B   7/2014
CN   103589201 B * 9/2015
(Continued)

OTHER PUBLICATIONS

Translation of abstract p. 1 ; TW-201348358-A; Charukijpipat S; Dec. 2013 (Year: 2013).*
(Continued)

*Primary Examiner* — Bryan D. Ripa
*Assistant Examiner* — Cameron K Miller
(74) *Attorney, Agent, or Firm* — Banner & Witcoff, Ltd.

(57) ABSTRACT

The present invention relates to a thermal emissivity coating composition comprising: a) an emissivity agent in an amount from 30 to 65% by weight with respect to the total weight of the thermal emissivity coating composition; b) a filler selected from the group consisting of oxides of aluminum, silicon, magnesium, calcium, boron and mixtures of
(Continued)

two or more thereof, in an amount from 10 to 35 wt % with respect to the total weight of the thermal emissivity coating composition; and c) a binder in an amount from 12 to 52 wt % with respect to the total weight of the thermal emissivity coating composition; wherein the emissivity agent comprises cobalt oxide in an amount from 10 to 25 wt %, preferably 12 to 25 wt % with respect to the total weight of the thermal emissivity coating composition and further comprises chromium oxide and titanium oxide.

16 Claims, 2 Drawing Sheets

(51) Int. Cl.
  *C09K 5/14* (2006.01)
  *C04B 111/00* (2006.01)

(52) U.S. Cl.
  CPC ....... *C09K 5/14* (2013.01); *C04B 2111/00163* (2013.01); *C04B 2111/00551* (2013.01); *C04B 2201/32* (2013.01)

(56) References Cited

FOREIGN PATENT DOCUMENTS

| | | | | |
|---|---|---|---|---|
| TW | 201348358 A | * | 12/2013 | ........... C01G 23/047 |
| WO | 2004063652 A2 | | 7/2004 | |
| WO | 2013130021 A1 | | 9/2013 | |

OTHER PUBLICATIONS

CN103589201B machine translation (Year: 2015).*
International Search Report and Written Opinion dated Nov. 19, 2019 for PCT/EP19/70464.

* cited by examiner

HIGH EMISSIVITY COATING COMPOSITION AND SUBSTRATE COATED THEREWITH

CROSS-REFERENCE TO RELATED APPLICATIONS

This application is a U.S. National Stage application under 35 U.S.C. § 371 of International Application PCT/EP2019/070464 (published as WO 2020/025601 A1), filed Jul. 30, 2019, which claims the benefit of priority to Application SG 10201806558T, filed Aug. 1, 2018. Benefit of the filing date of these prior applications is hereby claimed. Each of these prior applications is hereby incorporated by reference in its entirety.

FIELD OF THE INVENTION

The present invention relates generally to a thermal emissivity coating composition and a substrate coated therewith.

BACKGROUND OF THE INVENTION

Increasing demand for energy and rising energy costs throughout the world have inevitably increased the need for energy users to save or conserve energy, particularly among industrial entities. In many instances, industries that use fired heaters or furnaces, such as refineries and petrochemical complexes, have attempted to maximize fired heater efficiency to thereby reduce fuel consumption. High emissivity coating technology has become a proven means for various high temperature applications to effectively increase radiant heat transfer and save energy without compromising process reliability and safe operation.

Emissivity (symbolically represented as s or e) can be broadly defined as the relative ability of a surface to emit energy by radiation. More particularly, emissivity can be defined as the ratio of energy radiated by a particular material to energy radiated by a blackbody at the same temperature. Higher emissivity corresponds to an increase in thermal efficiency. An increase in thermal efficiency attributed to high emissivity coatings in high temperature fired heater or furnace applications results in an increase in fired heater or furnace performance or output and/or a decrease in fuel consumption and overall energy demand.

The benefits and advantages of high emissivity coatings have led to various research and development efforts over the years to improve the performance of high emissivity coatings. In particular, research has been conducted to develop emissivity coating compositions that include emissivity enhancing agents ("emissivity agents") to a) enhance emissivity values in order to increase radiant heat transfer, b) improve coating adhesion on substrates; c) extend coating lifetime across multiple high temperature cycles; and d) reduce emissivity agent degradation.

Currently, several high emissivity coating compositions are commercially available. Emissivity agents in such compositions can be derived from various sources. One commonly used emissivity agent is silicon carbide (SiC), which can exhibit good emissivity enhancement performance up to moderate temperatures. However, the use of SiC as an emissivity agent in applications involving high operating temperatures (e.g., fire heater, furnace, preheater, reformer, other refractory applications, or aerospace applications) can lead to a substantial decrease in emissivity and mechanical strength of the coating composition over time, and hence an overall decrease or degradation in the performance or function of a coating composition relying upon SiC as an emissivity agent.

WO2004/063652 A2 discloses an insulating brick to be built inside of an industrial furnace for high temperature heating comprising a blacken film layer in contact with an inside of the furnace, the blacken film layer having a blackness higher than 0.85 and may include 2-100 wt % of at least one kind of material selected from a group of materials including iron oxide, chromium oxide, manganese oxide, titanium oxide, and cobalt and balance of at least one kind of material selected from a group of material including aluminum oxide, silicon oxide, zirconia, magnesium oxide, calcium oxide, sodium oxide, silicon carbide and carbon.

WO2013/130021 A1 discloses a thermal emissivity coating composition comprising: a dry admixture of a set of emissivity agents including titanium dioxide, wherein a weight percentage of the titanium dioxide is less than approximately 22% by weight of the coating composition and at least approximately 10% by weight of the coating composition; and a set of matrix strength enhancers selected from at least one of ceramic borides, ceramic carbides, and ceramic nitrides.

SUMMARY OF THE INVENTION

It was found that the thermal emissivity coating compositions of the prior art still do not provide satisfying results when used as a ceramic coating on substrates, such as refractory bricks at high temperature application of, for example, 1100-1500° C.

It is therefore the object of the present invention to provide a thermal emissivity coating composition which overcomes the drawbacks of the prior art and can be especially coated on a substrate to be then used as a substrate with a ceramic coating for high temperature applications.

This object is achieved by a thermal emissivity coating composition comprising: a) an emissivity agent in an amount from 30 to 65% by weight, preferably 30 to 60% by weight, more preferred 30 to 50% by weight, even more preferred 30 to 45% by weight, most preferred 35 to 45% by weight with respect to the total weight of the thermal emissivity coating composition; b) a filler selected from the group consisting of oxides of aluminum, silicon, magnesium, calcium, boron and mixtures of two or more thereof, in an amount from 10 to 35 wt %, preferably 15 to 35 wt %, preferably 10 to 30 wt %, more preferred 13 to 25 wt %, even more preferred 13 to 20 wt %, moreover preferred 15 to 30 wt %, preferably 15 to 25 wt %, most preferred 15 to 20 wt % with respect to the total weight of the thermal emissivity coating composition; and c) a binder in an amount from 12 to 52 wt %, preferably 30 to 52 wt %, even more preferred 40 to 52 wt %, most preferred 40 to 45 wt % with respect to the total weight of the thermal emissivity coating composition; wherein the emissivity agent comprises cobalt oxide in an amount from 10 to 25 wt %, preferably 12 to 25 wt %, more preferred 10 to 20 wt %, even more preferred 10 to 15 wt %, moreover preferred 12 to 14 wt %, preferably 18 to 25 wt %, more preferred 18 to 23 wt %, moreover preferred 18 to 20 wt % with respect to the total weight of the thermal emissivity coating composition and further comprises chromium oxide and titanium oxide.

In one embodiment, the thermal emissivity coating composition comprises the chromium oxide in an amount from 5 to 10 wt %, preferably 5 to 8 wt %, more preferred 5 to 7 wt %, most preferred 5 to 6 wt % and/or the titanium dioxide in an amount from 13 to 30 wt %, preferably 13 to 20 wt %, more preferred 13 to 19 wt %, even more preferred 13 to 18 wt %, moreover preferred 15 to 18 wt %, respectively with respect to the total weight of the thermal emissivity coating composition.

In another embodiment, the filler comprises alumina, preferably in an amount from 10 to 30 wt %, preferably 15 to 30 wt %, more preferred 15 to 25 wt %, even more preferred 15 to 20 wt %, preferably 10 to 25 wt %, more preferred 10 to 20 wt %, even more preferred 10 to 18 wt % with respect to the total weight of the thermal emissivity coating composition, and/or silica in an amount from 3 to 18 wt %, preferably 3 to 15 wt %, more preferred 3 to 10 wt %, even more preferred 3 to 5 wt/o, most preferred 3 to 4 wt %, preferably 9 to 18 wt %, more preferred 12 to 18 wt %, even more preferred 15 to 18 wt % with respect to the total weight of the thermal emissivity coating composition.

Cobalt oxide may be selected from CoO, $Co_3O_4$ or the mixtures thereof, preferably the mixture of CoO and $Co_3O_4$.

Chromium oxide may be $Cr_2O_3$.

An average particle size of emissivity agent and filler may be equal or less than 100 micron, preferably equal or less than 65 micron, more preferred equal or less than 45 micron, most preferable equal or less than 35 micron.

An average particle size of $TiO_2$, $Cr_2O_3$, CoO, $CO_3O_4$, $SiO_2$ and $Al_2O_3$ may be equal or less than 100 micron, preferably equal or less than 65 micron, more preferred equal or less than equal or less than 45 micron, most preferable equal or less than 35 micron.

Fillers as used in the present disclosure may be materials that are added to other materials to lower the consumption of more expensive components in high emissivity coating compositions. Fillers useful in the present disclosure include, but are not limited to, aluminum oxide ($Al_2O_3$), silicon dioxide ($SiO_2$), magnesium oxide (MgO), calcium oxide (CaO), and boron oxide ($B_2O_3$).

As used in the present disclosure, emissivity agents are materials that increase the emissivity of high emissivity coating compositions to which the emissivity agent or enhancer is added. Suitable emissivity agents or emissivity enhancers include, but are not limited to, titanium dioxide ($TiO_2$), chromium oxide ($Cr_2O_3$), silicon dioxide ($SiO_2$), boron silicide ($B_4Si$), boron carbide ($B_4C$), silicon tetraboride ($SiB_4$), molybdenum disilicide ($MoSi_2$), tungsten disilicide ($WSi_2$), and zirconium diboride ($ZrB_2$).

In a further embodiment, the binder is selected from phosphoric acid, a phosphate salt or a mixture thereof.

The binder may be, but is not limited to, phosphoric acid ($H_3PO_4$), sodium aluminosilicate and/or potassium aluminosilicate to form, for instance, $Al_2(H_2P_2O_7)$, $Al(PO_3)_3$, $AlPO_4$ and/or $KAlSi_3O_8$.

In this regard, it may be preferred that the phosphoric acid/the phosphate salt is used in the form of a solution, preferably in form of an aqueous solution thereof.

In this regard, it may be preferred that the phosphoric acid in form of an aqueous solution contains 20 to 40% v/v, preferably 20 to 35% v/v, more preferred 20 to 30% v/v phosphoric acid.

In this regard, it may be preferred that the phosphate salt in form of an aqueous solution contains 20 to 40% v/v, preferably 20 to 35% v/v, more preferred 20 to 30% v/v phosphate salt.

In one embodiment, it may be provided that the inventive thermal emissivity coating composition does not contain $MnO_2$.

In a further embodiment, it may be provided that the inventive emissivity coating composition does not contain $HfO_2$.

In a further embodiment, it may be provided that the inventive thermal emissivity coating does not contain $Nb_2O_3$.

The object is also achieved by a thermal emissivity coating composition consisting of: a) an emissivity agent in an amount from 30 to 65% by weight, preferably 30 to 60% by weight, more preferred 30 to 50% by weight, even more preferred 30 to 45% by weight, most preferred 35 to 45% by weight with respect to the total weight of the thermal emissivity coating composition; b) a filler selected from the group consisting of oxides of aluminum, silicon, magnesium, calcium, boron and mixtures of two or more thereof, in an amount from 10 to 35 wt % preferably 15 to 35 wt %, preferably 10 to 30 wt %, more preferred 13 to 25 wt %, even more preferred 13 to 20 wt %, moreover preferred 15 to 30 wt %, preferably 15 to 25 wt %, most preferred 15 to 20 wt % with respect to the total weight of the thermal emissivity coating composition; and c) a binder in an amount from 12 to 52 wt %, preferably 30 to 52 wt %, even more preferred 40 to 52 wt %, most preferred 40 to 45 wt % with respect to the total weight of the thermal emissivity coating composition; wherein the emissivity agent comprises cobalt oxide in an amount from 10 to 25 wt %, preferably 12 to 25 wt %, more preferred 10 to 20 wt %, even more preferred 10 to 15 wt %, moreover preferred 12 to 14 wt %, preferably 18 to 25 wt %, more preferred 18 to 23 wt %, moreover preferred 18 to 20 wt % with respect to the total weight of the thermal emissivity coating composition and further comprises chromium oxide and titanium oxide.

The object is also achieved by a thermal emissivity coating composition consisting of cobalt oxide, titanium dioxide, chromium oxide, alumina, silicon dioxide and binder.

The object is also achieved by a thermal emissivity coating composition consisting of cobalt oxide in an amount from 10 to 25 wt. %, preferably 12 to 25 wt %, more preferred 10 to 20 wt/o, even more preferred 10 to 15 wt %, moreover preferred 12 to 14 wt %, preferably 18 to 25 wt %, more preferred 18 to 23 wt %, moreover preferred 18 to 20 wt % with respect to the total weight of the thermal emissivity coating composition, titanium dioxide in an amount from 13 to 30 wt %, preferably 13 to 20 wt %, more preferred 13 to 19 wt %, even more preferred 13 to 18 wt %, moreover preferred 15 to 18 wt % with respect to the total weight of the thermal emissivity coating composition, chromium oxide in an amount from 5 to 10 wt. %, preferably 5 to 8 wt %, more preferred 5 to 7 wt %, most preferred 5 to 6 wt % with respect to the total weight of the thermal emissivity coating composition, alumina in an amount from 10 to 30 wt. %, preferably 15 to 30 wt %, more preferred 15 to 25 wt %, even more preferred 15 to 20 wt %, preferably 10 to 25 wt %, more preferred 10 to 20 wt %, even more preferred 10 to 18 wt % with respect to the total weight of the thermal emissivity coating composition, silicon dioxide in an amount from 3 to 18 wt. %, preferably 3 to 15 wt %, more preferred 3 to 10 wt %, even more preferred 3 to 5 wt %, most preferred 3 to 4 wt %, preferably 9 to 18 wt %, more preferred 12 to 18 wt %, even more preferred 15 to 18 wt % with respect to the total weight of the thermal emissivity coating composition and an aqueous solution of phosphoric acid in an amount from 12 to 52 wt. %, preferably 30 to 52 wt %, even more preferred 40 to 52 wt %, most preferred 40 to 45 wt % with respect to the total weight of the thermal emissivity coating composition.

The object is further achieved by a method for preparing a high emissivity coating on a substrate comprising the steps of a) providing a substrate; b) coating the thermal emissivity coating composition according to any of the preceding claims on at least one surface of the substrate; and c) heat-treating the thermal emissivity coating composition coated on the substrate.

In one embodiment, the substrate is selected from a refractory brick and a plastic refractory.

In a further embodiment, the heat-treating is at a temperature from 500 to 1,700° C. for 1 to 5 hours.

In another embodiment, the coating is spray coating, brush coating, dip coating or two or more thereof.

In a further embodiment, the spray coating is air spray coating.

The object is further achieved by a coated substrate, which is obtainable by the inventive method, in particular coaling the thermal emissivity coating composition according to the present invention on the substrate and heat-treating so that the thermal emissivity coating composition is formed into a ceramic coating.

According to one embodiment, the substrate is selected from a refractory brick and a plastic refractory.

According to another embodiment, heat-treating is carried out at a temperature of about 1300-1700° C. for about 1-5 hours.

It was surprisingly found that the thermal emissivity coating composition of the present invention can be advantageously utilized as high emissivity coating for high temperature application of about 1100-1500° C. Especially, the inventive thermal emissivity coating composition provides high emissivity at high temperatures of above 1100° C. and provides sufficient surface strength when coated on a substrate and sufficient abrasion resistance and excellent thermal spalling.

Unlike other emissivity coatings that exhibit cracking and delamination from substrates to which the coatings are applied, embodiments of the subject matter described herein survive repeated temperature cycles from room temperature to temperatures typically used in, for example decoking cycles, e.g., about 1100° C. to about 1600° C. or higher, without cracking or delamination from underlying substrates.

It will be appreciated that, although specific embodiments of the present disclosure have been described herein for purposes of illustration, various modifications may be made without departing from the scope of the disclosure. Accordingly, the disclosure is not limited except as by the appended claims.

BRIEF DESCRIPTION OF THE DRAWINGS

In the following, further advantages and features of the subject-matter of the present application will be illustrated by way of examples together with drawings, wherein.

DETAILED DESCRIPTION OF THE INVENTION

Figure 1:
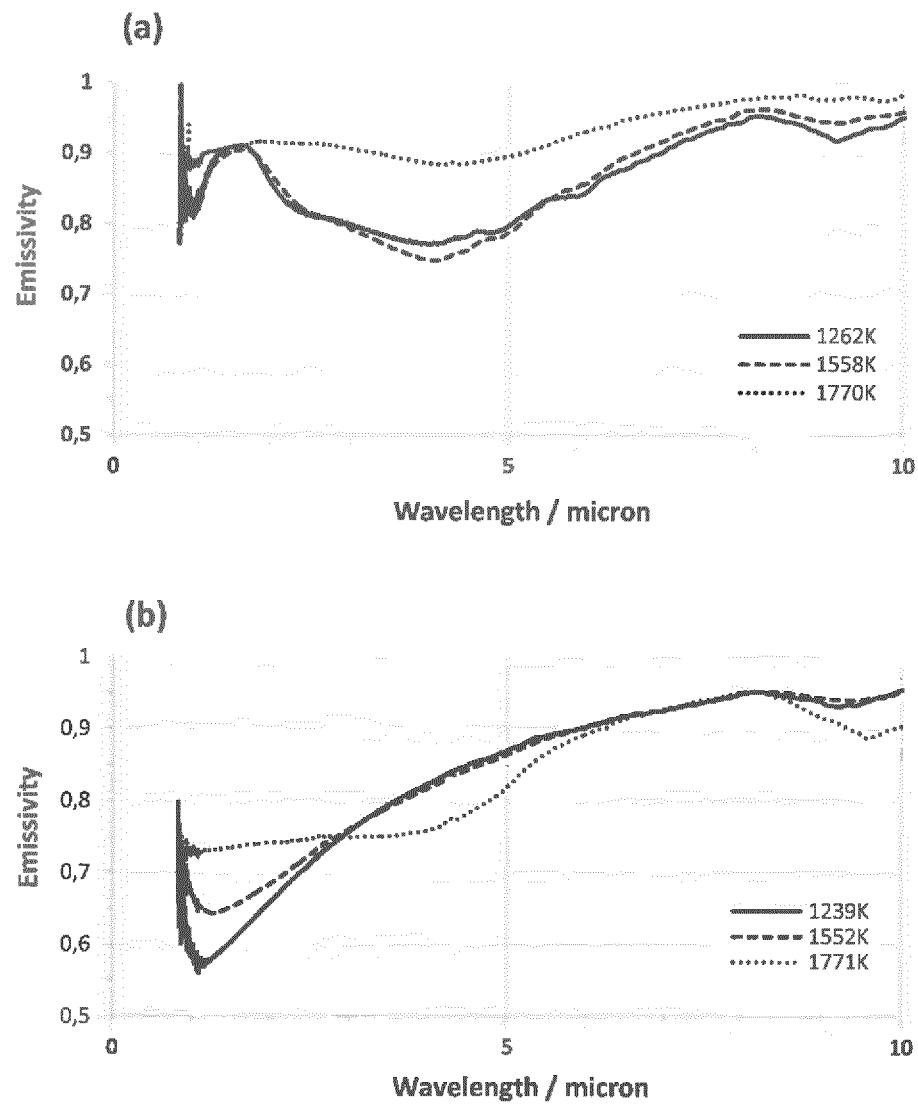
FIG. 1 illustrates FTIR spectra showing emissivity of (a) Example 2 and (b) comparative Example 2 on the wavelength in a range of about 0-10 microns.

In the following description, certain specific details are set forth in order to provide thorough understanding of various aspects of the disclosed subject matter. However, the disclosed subject matter may practice without these specific details. In some instance, well-known structures and methods of mixing ceramic precursors and applying high emissivity coating to substrates comprising embodiments of the subject matter disclosed herein have not been described in detail to avoid obscuring the description of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to".

The term "phosphoric acid" is to be understood as an aqueous solution containing $H_3PO_4$.

In the inventive thermal emissivity coating composition the amounts of the ingredients are given in parts per weight, but are preferably "weight percent" summing up in total to 100 wt % of the total thermal emissivity coating composition.

EXAMPLES

The examples of an inventive thermal emissivity coating composition have been prepared in general as follows:

Each coating composition was prepared using predetermined amounts of the ingredients. Unless stated otherwise, the ingredients were derived from commercially available sources. The ingredients in solid form for preparing each of coating composition had an average particle size less than approximately 325-mesh.

Example 1

About 10 wt % alumina oxide, 20 wt % cobalt oxide, 6 wt % chromic oxide, 3 wt % silicon dioxide, and 18 wt % Titanium dioxide were introduced into and then stirred in a mixing tank that achieved uniform mixing as evidenced by the absence of residue larger than about 250 microns. Subsequent to stirring, 43 wt % of an aqueous solution containing about 28% v/v phosphoric acid in an amount as disclosed above was introduced into the mixing tank as a binder. The resulting mixture was allowed to stir for several minutes and the coating compositions were obtained therefrom.

Example 2

Example 2 was prepared in the same manner as Example 1, except about 16 wt % Alumina oxide, 14 wt % Cobalt Oxide, 6 wt % Chromic Oxide, 3 wt % Silicon dioxide, and 18 wt % Titanium dioxide were introduced.

Comparative Example 1

Comparative example 1 was prepared in the same manner as example 1, except about 9 wt % silicon carbide, 16 wt % Alumina oxide, 5 wt % Cobalt Oxide, 6 wt % Chromic Oxide, 3 wt % Silicon dioxide, and 18 wt % Titanium dioxide were introduced.

Comparative Example 2

Comparative example 2 was prepared in the same manner as example 1, except about 14 wt % silicon carbide, 16 wt % Alumina oxide, 6 wt % Chromic Oxide, 3 wt % Silicon dioxide, and 18 wt % Titanium dioxide were introduced.

The coating compositions were applied to substrates by conventional air spray methods. The coating composition was sprayed on the substrate with desired thickness of about 100 to 300 μm. Then a heat-treatment was carried out at a temperature of about 500 to 1700° C. with a heating rate of 30 to 150° C./h for about two hours to obtain the final coating on a substrate.

As a substrate a plastic refractory has been used which was prepared by mold casting to provide size of 115×76×25 mm. Before being coated with the coating composition, the substrate was dried in atmosphere over night and was then further heat-treated at 1500° C. for 2 hours and was then cooled to room temperature before coating with the coating composition.

Plastic refractories in this regard are mixtures of refractory materials prepared in a stiff plastic condition for application without further preparation. They are generally rammed in place with a pneumatic hammer or pounded with a mallet. Plastic refractories are easily adaptable for making quick, economical, emergency repairs and can be rammed to any shape or contour.

Emissivity

The spectral emissivity of thermal emissivity coating compositions of the present invention and of a Comparative Examples at 600-1500° C. have been measured by FTIR technique (Nicolet 6700 FTIR spectrometer).

Calculated emissivity are from calculation based on the FTIR results using the equation given by Planck's law.

Thermal radiation power of a black body per unit area of radiating surface per unit of solid angle and per unit wavelength λ:

$$u(\lambda, T) = \frac{\beta}{\lambda^5} \cdot \frac{1}{e^{hc/k_B T\lambda} - 1}$$

where $\beta=2hc^2$; h is Planck's constant; b=Wien's displacement; $k_B$=Boltzmann constant; T=temperature and c=speed of light.

Figure 2:
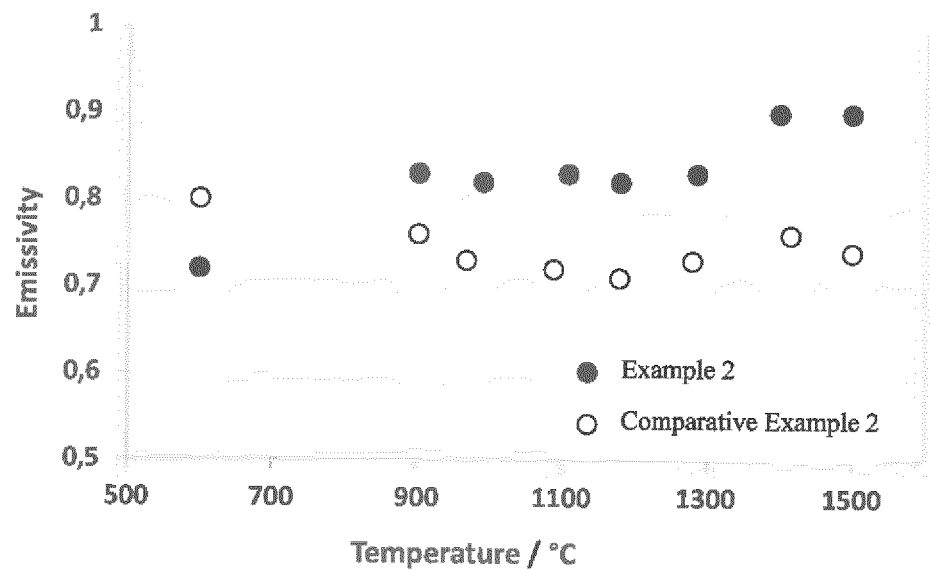
FIG. 2 illustrates a graph illustrating the emissivity of Example 2 and comparative Example 2 dependent on the temperature.

Considering the blackbody radiation, as the temperature increases, the peak of the black-body radiation curve moves to shorter wavelengths. In the experiment analysis, the wavelength 1-5 micron is considered. The results from FIG. 1 confirm that, at wavelength 0.8-5 micron which represent emissivity at high temperature, the emissivity of the inventive coating composition example 2 is higher than of the Comparative example 2. FIG. 2 which is the results converted from FTIR spectra, shows that the emissivity of example 2 increases with the temperature. Contrary to comparative example 2, the emissivity decrease when the temperature increases.

Table 2 shows the calculated emissivity based on Equation given by Plank's law. The inventive coating compositions show highest emissivity at high temperatures.

TABLE 2

Emissivity of the Examples at various temperature

| Temperature | Emissivity | | | |
|---|---|---|---|---|
| | Example 1 | Example 2 | Comparative example 1 | Comparative example 2 |
| 600 | 0.76 | 0.76 | 0.79 | 0.84 |
| 900 | 0.83 | 0.83 | 0.76 | 0.80 |
| 1000 | 0.84 | 0.84 | 0.76 | 0.79 |

TABLE 2-continued

Emissivity of the Examples at various temperature

| Temperature | Emissivity | | | |
|---|---|---|---|---|
| | Example 1 | Example 2 | Comparative example 1 | Comparative example 2 |
| 1100 | 0.84 | 0.84 | 0.75 | 0.78 |
| 1200 | 0.84 | 0.84 | 0.75 | 0.77 |
| 1300 | 0.84 | 0.84 | 0.75 | 0.77 |
| 1400 | 0.84 | 0.84 | 0.75 | 0.76 |
| 1500 | 0.84 | 0.84 | 0.75 | 0.75 |

Thermal Spalling

The sample were put into a furnace and then heated-up to 1500° C. for 2 hrs and cooled down. Repeated heating and cooling for 7 times to see whether the coating is peel-off.

Figure 3:
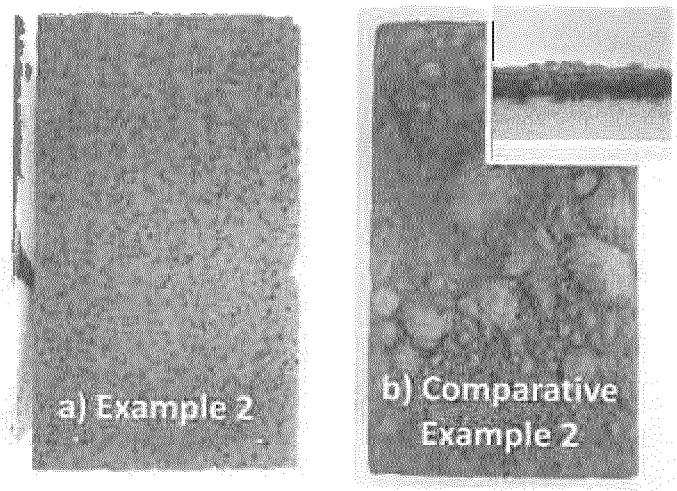
FIG. 3 illustrates thermal spelling of a substrate coated with inventive Example 2 and comparative Example 2.

The thermal spalling of inventive and comparative examples has been tested on refractory brick substrates. It was found that the present coating composition showed better properties when coated on refractory bricks as shown in FIG. 3.

The features disclosed in the foregoing description, in the claims and/or in the accompanying drawings may, both separately and in any combination thereof, be material for realizing the invention in diverse forms thereof.

The invention claimed is:

1. A thermal emissivity coating composition comprising:
   a) an emissivity agent in an amount from 30 to 65% by weight with respect to the total weight of the thermal emissivity coating composition;
   b) a filler selected from the group consisting of oxides of aluminum, silicon, magnesium, calcium, boron and mixtures of two or more thereof, in an amount from 10 to 35 wt % with respect to the total weight of the thermal emissivity coating composition; and
   c) a binder in an amount from 12 to 52 wt % with respect to the total weight of the thermal emissivity coating composition;
      wherein the emissivity agent comprises cobalt oxide in an amount from 10 to 25 wt % with respect to the total weight of the thermal emissivity coating composition and further comprises chromium oxide and titanium oxide.

2. The thermal emissivity coating composition according to claim 1 comprising the chromium oxide in an amount from 5 to 10 wt %, and/or the titanium dioxide in an amount from 13 to 30 wt %, respectively with respect to the total weight of the thermal emissivity coating composition.

3. The thermal emissivity coating composition according to claim 1, wherein the filler comprises alumina in an amount from 10 to 30 wt %, with respect to the total weight of the thermal emissivity coating composition, and/or silica in an amount from 3 to 18 wt %, with respect to the total weight of the thermal emissivity coating composition.

4. The thermal emissivity coating composition according to claim 1, wherein the binder is selected from phosphoric acid, a phosphate salt or a mixture thereof.

5. A method for preparing a high emissivity coating on a substrate comprising the steps of
   a) providing a substrate;
   b) coating the thermal emissivity coating composition according to claim 1 on at least one surface of the substrate; and c) heat-treating the thermal emissivity coating composition coated on the substrate.

6. The method according to claim 5, wherein the substrate is selected from a refractory brick and a plastic refractory.

7. The method according to claim 5, wherein the heat-treating is at a temperature from 500 to 1,700° C. for 1 to 5 hours.

8. The method according to claim 5, wherein the coating is spray coating, brush coating, dip coating or two or more thereof.

9. The method according to claim 8, wherein the spray coating is air spray coating.

10. A coated substrate made by the method according to claim 5.

11. The thermal emissivity coating composition of claim 1, comprising the filler in an amount from 15 to 35 wt % with respect to the total weight of the thermal emissivity coating composition.

12. The thermal emissivity coating composition of claim 1, wherein the emissivity agent comprises cobalt oxide in an amount from 12 to 25 wt % with respect to the total weight of the thermal emissivity coating composition.

13. The thermal emissivity coating composition of claim 2, comprising chromium oxide in an amount from 5 to 8 wt % with respect to the total weight of the thermal emissivity composition.

14. The thermal emissivity coating composition of claim 2, comprising titanium dioxide in an amount from 13 to 20 wt % with respect to the total weight of the thermal emissivity composition.

15. The thermal emissivity coating composition of claim 3, wherein the filler comprises alumina in an amount from 15 to 30 wt % with respect to the total weight of the thermal emissivity coating composition.

16. The thermal emissivity coating composition of claim 3, wherein the filler comprises silica in an amount from 3 to 4 wt % with respect to the total weight of the thermal emissivity coating composition.

* * * * *